(12) United States Patent
Amerom et al.

(10) Patent No.: US 7,595,569 B2
(45) Date of Patent: Sep. 29, 2009

(54) VERSATILE AND INTELLIGENT POWER CONTROLLER

(75) Inventors: Jan Amerom, Reeuwijk (NL); Guus Jansen, S. Michelsgestel (NL); Douglas D. Lopata, Boyertown, PA (US); Marcel Slomp, Nieuwegein (NL); Maarten Visee, Houten (NL)

(73) Assignee: Agere Systems Inc., Allentown, PA (US)

( * ) Notice: Subject to any disclaimer, the term of this patent is extended or adjusted under 35 U.S.C. 154(b) by 353 days.

(21) Appl. No.: 11/059,787

(22) Filed: Feb. 17, 2005

(65) Prior Publication Data

US 2005/0194839 A1    Sep. 8, 2005

Related U.S. Application Data

(60) Provisional application No. 60/545,339, filed on Feb. 17, 2004.

(51) Int. Cl.
G05F 1/00     (2006.01)
H02H 3/20    (2006.01)
H02H 3/24    (2006.01)
H02J 1/10     (2006.01)

(52) U.S. Cl. .............. 307/82; 307/58; 307/70; 307/71; 307/80; 323/271; 323/272; 361/90

(58) Field of Classification Search .......... 323/271, 323/272; 307/70, 71, 80; 361/90
See application file for complete search history.

(56) References Cited

U.S. PATENT DOCUMENTS

| | | | |
|---|---|---|---|
| 5,274,828 A * | 12/1993 | McAdams ............ 713/300 |
| 5,297,015 A * | 3/1994 | Miyazaki et al. .......... 363/146 |
| 5,301,160 A * | 4/1994 | McAdams ................ 365/226 |
| 5,560,022 A | 9/1996 | Dunstan et al. .......... 395/750 |
| 5,734,919 A | 3/1998 | Walsh et al. ............. 395/800 |
| 5,880,945 A * | 3/1999 | Borkar ................... 363/65 |
| 6,031,743 A * | 2/2000 | Carpenter et al. .......... 363/65 |
| 6,058,030 A | 5/2000 | Hawkes et al. ............ 363/65 |
| 6,181,120 B1 | 1/2001 | Hawkes et al. ........... 323/282 |
| 6,337,563 B2 | 1/2002 | Takimoto et al. ......... 323/284 |
| 6,404,077 B1 | 6/2002 | Moran ................... 307/87 |
| 6,424,128 B1 * | 7/2002 | Hiraki et al. ............ 323/268 |
| 6,456,086 B1 * | 9/2002 | Bolz et al. .............. 324/522 |
| 6,566,766 B2 | 5/2003 | Matsuda et al. .......... 307/82 |
| 6,642,750 B1 | 11/2003 | Egan .................... 327/63 |
| 6,683,767 B2 * | 1/2004 | Ito et al. ................. 361/56 |

(Continued)

OTHER PUBLICATIONS

U.S. Appl. No. 11/059,783, filed Feb. 17, 2005, Lopata.

(Continued)

*Primary Examiner*—Albert W Paladini
*Assistant Examiner*—Hal I Kaplan
(74) *Attorney, Agent, or Firm*—Mendelsohn, Drucker & Associates, PC; David L. Cragille; Steve Mendelsohn

(57) ABSTRACT

The invention provides a monolithic, highly integrated power supply circuit capable of providing various voltages for circuits on an expansion card, either from a main supply source or an auxiliary supply source. The monolithic power supply circuit preferably includes two switching converters, two low-drop-out regulators, a standby regulator, a reset circuit, and a control circuit. An associated method for providing various voltages via a monolithic power supply circuit is also disclosed.

22 Claims, 5 Drawing Sheets

U.S. PATENT DOCUMENTS

| | | | |
|---|---|---|---|
| 6,696,825 B2 | 2/2004 | Harris et al. | 323/282 |
| RE38,487 E | 4/2004 | Isham et al. | 323/224 |
| 6,771,052 B2 | 8/2004 | Ostojic | 323/266 |
| 6,819,537 B2* | 11/2004 | Pohlman et al. | 361/64 |
| 6,853,174 B1* | 2/2005 | Inn | 323/285 |
| 6,989,659 B2* | 1/2006 | Menegoli et al. | 323/274 |
| 7,030,694 B2* | 4/2006 | Jonkman | 330/251 |
| 7,215,043 B2* | 5/2007 | Tsai et al. | 307/130 |
| 2004/0046532 A1* | 3/2004 | Menegoli et al. | 323/273 |

OTHER PUBLICATIONS

Ghovanloo et al., "A modular 32-Site Wireless Neural Stimulation Microsystem," *IEEE Journal of SolidState Circuits*, vol. 39, No. 12, 2457-2466 (Dec. 2004).

Schenkel et al., "Transient Minority Carrier Collection from the Subtrate in Smart Power Design," I C & D Deliverable 6.2.1.5, 31st European Solid-State Device Research Conference, 411-414 (Sep. 2001).

Kugelstadt, "Fundamental Theory of PMOS Low-Dropout Voltage Regulators," *Texas Instruments Mixed Signal Products—Application Report*, 1-5 (Apr. 1999).

"Dual Input SmartOR Power Switch," CMPW R025 Datasheet, *California Micro Devices*, 1-11 (Aug. 2002).

"100% Duty Cycle, Low-Noise, Step-down,PWM DC-DC Converter," MAX 887 Datasheet, *Maxim*, 1-12 (Sep. 1996).

"300mA LDO Linear Regulators with Internal Microprocessor Reset Circuit," MAX 6469-MAX 6484 Datasheet, *Maxim*, 1-20 (Mar. 2004).

"Power Source Selector for Dual_Battery Systems," MAX1773/MAX1773A Datasheet, *Maxim*, 1-20 (Jan. 2003).

"High efficiency DC/DC Converter Chip Scale Package," TEA 1207 UK Datasheet, *Koninklijke Phillips Electronics N.V.*, 1-19 (Jul. 2002).

"Controller for power supply and battery management," *Koninklijke Phillips Electronics N.V.*, PCF 50603 Datasheet, 1-27 (Oct. 2003).

"P-Channel 2.5-V (G-S) Mosfet," *Vishay Silconix*, Si2301 BDS Datasheet. Document No. 72066, Rev. B, 1-5 (Oct 2003).

"Triple Output Regulator with Single Synchronous Buck and Dual LDO," ISL6413 Datasheet, *Intersil*, 1-2 (Oct. 2003).

"DC-DC Converter-Tutorial," *Maxim Application Note 710*, 1-10 (Oct. 2000).

Agere, LDO Proposal, Jun. 22, 2001 (redacted).

* cited by examiner

VERSATILE AND INTELLIGENT POWER CONTROLLER

CROSS-REFERENCES

This application claims the benefit under 35 U.S.C. § 119 (e) of provisional application No. 60/545,339 filed Feb. 17, 2004, which is hereby incorporated by reference in its entirety.

FIELD OF THE INVENTION

The present invention relates to a switching power supply circuit for electronic devices.

BACKGROUND OF THE INVENTION

Modern computers are generally designed to receive expansion cards that add functionality to the computer. Such expansion cards may include, for example, a LAN network interface card, a wireless LAN card, a graphic accelerator card, etc., and are typically designed to be compatible with a given industry specification (e.g. mPCI, Cardbus, PC-card, etc.). These expansion cards are typically plugged in to the "host" computer and operate from the host's power supply or supplies. Certain industry specifications (e.g., the mPCI specification) presently require expansion cards to operate either from a main power supply or an auxiliary power supply (e.g., derived from a battery), which typically provide supply voltages of either 3.3V or 5.0V to the various circuits in the computer. In general, however, due to advances in integration technology and power management, modern integrated circuits ("ICs") typically are designed to operate from a supply voltage of 3.3V (rather than 5.0V), and many are now designed to operate from a supply voltage of 1.5 V.

For these reasons, expansion cards conventionally include a power controller to select either a main or auxiliary supply voltage (which may be either 3.3V or 5.0V) from a host computer and convert the selected supply voltage to the voltages that are needed by the IC's on the expansion card. The power controller conventionally also functions as an on/off switch for the expansion card, so that the CPU in the host computer may shut down the expansion card as needed, e.g., to save power in a standby mode. It further conventionally includes a "bypass" circuit that is used to pass one of the supply voltages directly to the ICs on the expansion card without any voltage conversion, e.g., when the host voltage is so close to the voltages needed by the expansion card that voltage conversion is impossible. The power controller may also include circuits for monitoring the host main and auxiliary supply voltages and for sending a "reset" or shut-down signal to the ICs on the expansion card in the event of an overvoltage or undervoltage condition or in response to a RESET command from the host computer. Finally, the power controller may also include a standby supply circuit that provides power to certain circuits on the expansion card that remain active even when the expansion card is placed in standby mode (e.g., a wake-up circuit).

These features have conventionally been implemented via a custom-designed power controller circuit using a large number of discrete components and ICs. For example, a conventional power controller may require more than 28 discrete components, including a switching IC for on/off switching, a supply selection switch IC, one or more "main" DC/DC converter ICs having a linear regulator or a high-efficiency switched mode power supply ("SMPS") converter, a "standby" supply DC/DC converter IC, and several supply monitoring and reset logic circuits including internal references, voltage comparators, time-delay circuits, etc.

FIG. 1 illustrates the manner in which supply selection and voltage conversion have been implemented in conventional expansion card power controllers. The host main and auxiliary supply voltages are received at terminals 102 and 100, respectively, and are connected to supply selection switch IC 108 (an SPDT-type switch) via terminals 104, 106. The selected output voltage at node 110 is then input to one or more DC/DC converter ICs 118. As shown in FIG. 1, the DC/DC converter ICs 118 are conventionally either switching-type converters (including two FET switches 114, 116, a pass inductor L1, and a shunt capacitor C1, as shown) or linear-drop-out regulators.

FIG. 2 provides a more detailed illustration of the conventional power controller circuit shown in FIG. 1. Supply selection switch IC 108 is conventionally an IC having two high-power, low-impedance FETs Q1 and Q2 and associated switching control circuitry. Switching transistors Q1 and Q2 are connected to the main supply voltage via IC pin 206 and the auxiliary supply voltage via IC pin 208, and their source terminals are connected together (at node 210) to IC pin 212.

DC/DC converter IC 114, as shown in FIG. 2, includes transistors Q3 and Q4, which operate essentially as switches that are either open or closed. Transistors Q3 and Q4 are controlled via control logic 220. The source terminal of transistor Q3 and the drain terminal of transistor Q4 are connected via IC pin 222 to series inductor L1. Inductor L1 in turn is connected to the output node 234, where the regulated voltage is output to the other circuits on the expansion card. Capacitor C1 is connected from node 234 to ground, in order to stabilize the output voltage against transients that the supply selection switch 108 and any bypass circuitry (not shown) tend to create. The output voltage is taken at node 234 and also fed back via IC pin 224 to control logic 220.

As is known in the art, DC/DC converter IC 114 operates by switching the high-side power transistor Q3 in a pulse-width-modulated manner, while simultaneously switching the low-side transistor Q4 in an opposite fashion. In other words, when transistor Q3 is open, transistor Q4 is closed, and vice versa. As such, the source voltage at pin 216 is periodically connected to inductor L1 and capacitor C1. The voltage developed across capacitor C1 powers the load at node 234. In addition, the output voltage is typically sensed, such as by a voltage divider, and fed as one input to an error amplifier (in control logic 220). A reference voltage is fed to a second input of the error amplifier. The output of the error amplifier feeds one input of a comparator (also in control logic 220). The other comparator input is typically fed by a periodic control waveform, such as a triangle wave. The comparator, in turn, operates the power switch with a series of control pulses, the width of which are used to regulate the load voltage to the desired level despite fluctuations in the load.

In conventional expansion cards, additional power converters or linear regulator ICs (LDO1 and LDO2, not shown) may further be connected to IC pin 212 of the supply selection switch 108. These additional regulators may be used to provide additional supply voltages that may be needed by the circuits on the expansion card (e.g., 1.5 V).

It will be recognized that the conventional power controller described above is both complex and expensive. The power controller for each expansion card is conventionally custom designed. Although custom designs provide the benefit that the power controller can be optimized for a given expansion card's power requirements, the labor cost required to design a conventional power controller is very high. Because of this high labor cost and the cost of the numerous discrete components contained in the conventional power controller, the conventional power controller represents a substantial part of the overall cost of an expansion card. It would therefore be desirable to provide a power controller that could be integrated onto a single monolithic integrated circuit with a reduced number of components.

SUMMARY OF THE INVENTION

The present invention provides a monolithic, highly integrated power supply controller circuit capable of providing various voltages for circuits on an expansion card, either from a main supply source or an auxiliary supply source.

The invention provides a dual-supply switching converter comprising as few as two high-side switching transistors and a low-side rectifying device. In accordance with the invention, the two high-side switching transistors each are connected to a different power supply. Operation from either power supply is then made possible by disabling the high-side transistor connected to the non-selected power supply, and then operating the high-side transistor connected to the selected power supply in conjunction with the low-side rectifying device to produce a switched, regulated output in the conventional manner. Transfer from one power supply to the other is accomplished via a break-before-make technique (i.e., the operating high-side transistor is disabled before the other high-side transistor is caused to begin operating as a high-frequency switch).

The invention further provides a method of producing a regulated voltage from a first supply voltage and a second supply voltage, comprising the steps of: (a) providing the first supply voltage to the first high-side switch; (b) providing the second supply voltage to the second high-side switch; (c) selecting one of the first and second high-side switches to be a first active switch and the other one of the first and second high-side switches to be a first inactive switch; (d) deactivating the high-side switch selected as the first inactive switch; (e) switching the high-side switch selected as the first active switch at a switching frequency to produce a switched output signal; and (f) rectifying the switched output signal to produce a regulated output signal.

The invention still further provides a multiple-output power supply device, comprising: a monolithic integrated circuit including a first switching converter on a first portion of the monolithic integrated circuit; a second switching converter on a second portion of the monolithic integrated circuit; and a control circuit connected to the first and second switching converters and capable of enabling and disabling one or both of the first and second switching converters. The first switching converter may include a terminal for receiving a first supply voltage and a terminal for receiving a second supply voltage. The first switching converter may further be capable of converting a selected one of the first and second supply voltages to a regulated output signal.

The invention also provides a method for providing a plurality of regulated output voltages via a single monolithic integrated circuit, comprising the steps of: providing a first switching converter on a first portion of the monolithic integrated circuit; providing a second switching converter on a second portion of the monolithic integrated circuit; providing a control circuit connected to the first and second switching converters; and enabling and disabling one or both of the first and second switching converters via the control circuit.

BRIEF DESCRIPTION OF THE DRAWINGS

Various embodiments of the present invention will now be described in detail in conjunction with the annexed drawings, in which.

DETAILED DESCRIPTION

As described above, the present invention is a highly integrated power controller for providing various voltages to circuits on an expansion card. The extensive level of circuit integration in the present invention is accomplished by a unique combination of the functions conventionally performed by a voltage supply selection IC with the functions conventionally performed by a switching DC/DC converter.

Figure 1:
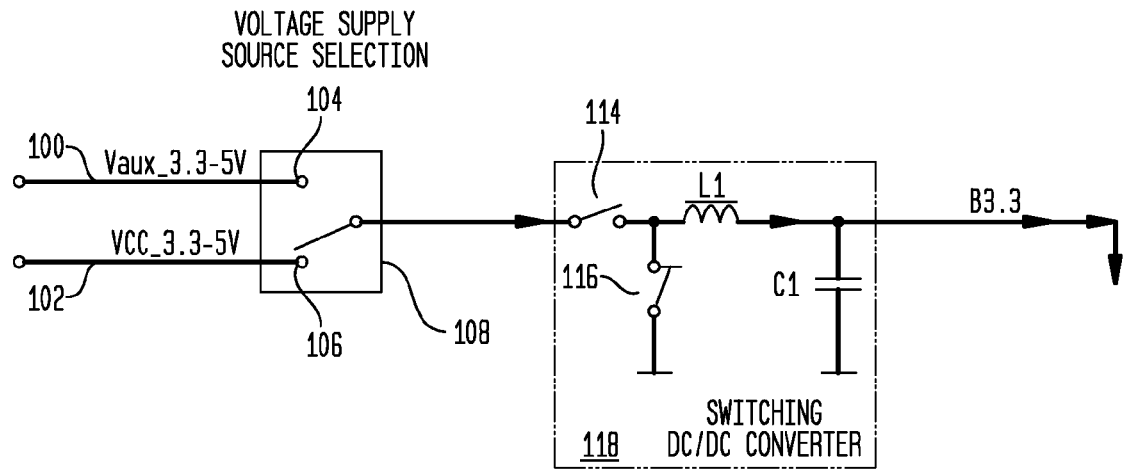
FIG. 1 is a block diagram depicting a conventional power controller for an expansion card.
Figure 3:
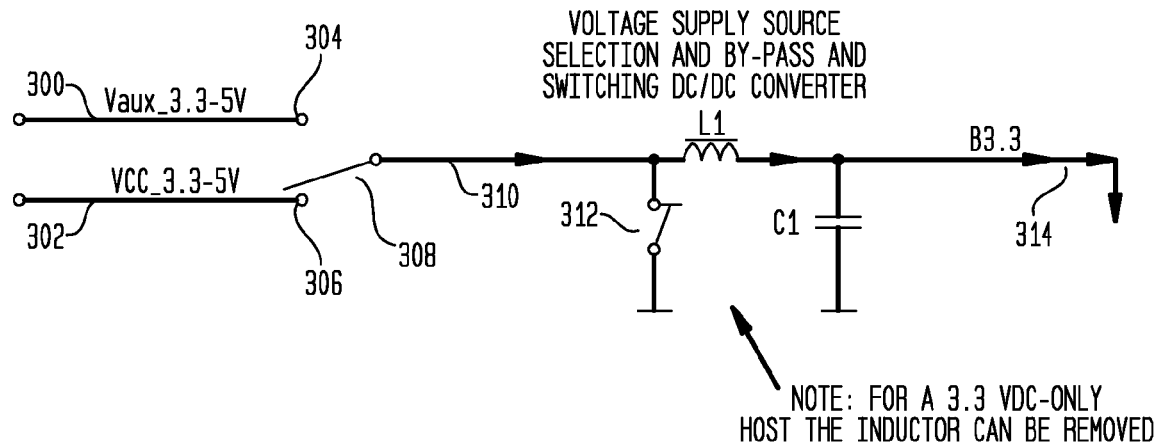
FIG. 3 is a block diagram depicting a power controller in accordance with the invention.
Figure 2:
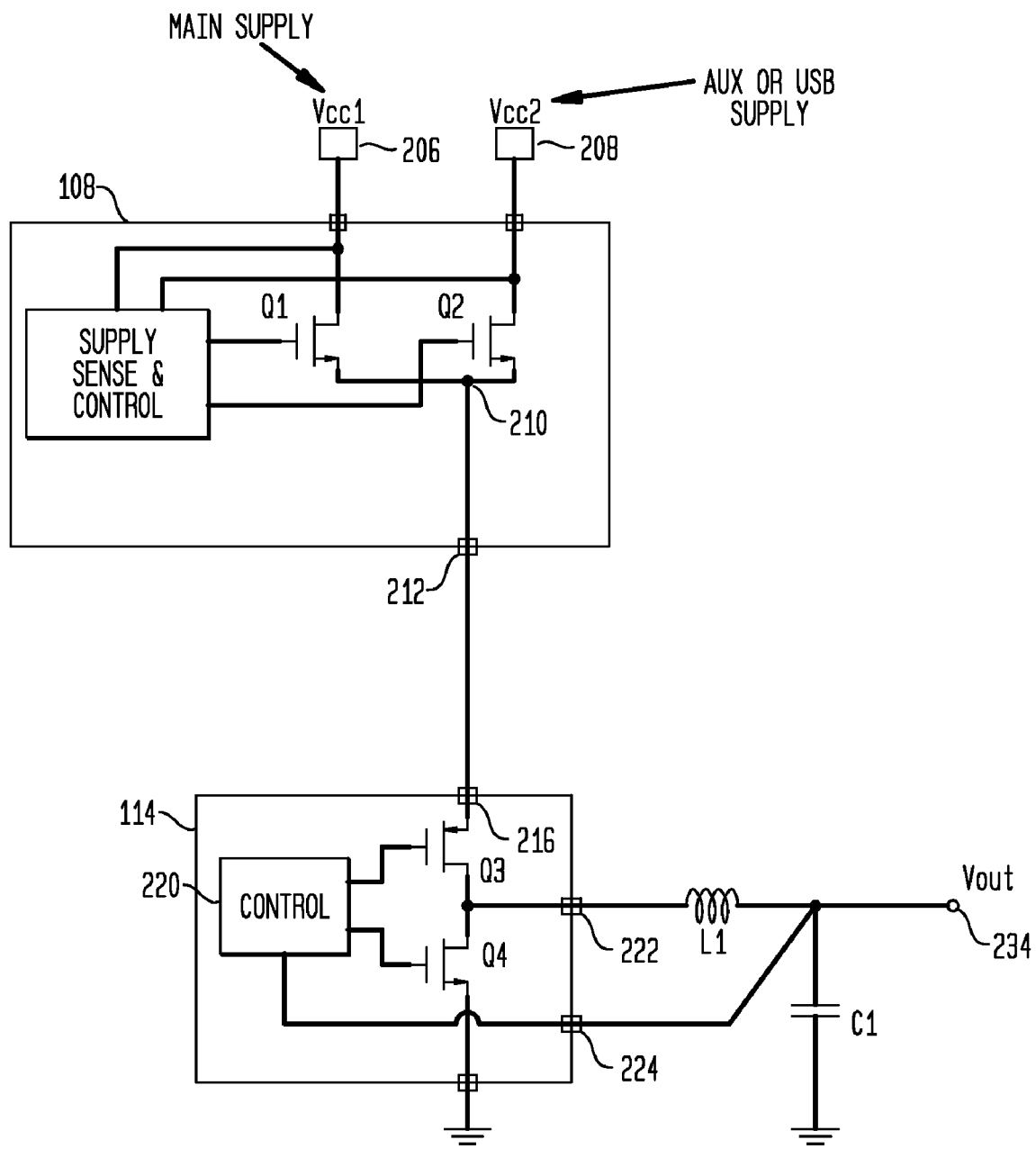
FIG. 2 is a block diagram further depicting the conventional power controller of FIG. 1.

FIG. 3 is a block diagram depicting a dual-supply switching converter ("DSSC") in accordance with this aspect of the invention. As in FIG. 1, the main and auxiliary supply voltages are input at terminals 302 and 300, and respectively provided to terminals 306 and 304 of the supply selection switch 308. In accordance with the invention, the two SPST switches that make up the supply selection switch 308 (an SPDT switch) are operated such that the connection between terminals 304 and 310 (for auxiliary supply) or between terminal 306 and 310 (for main supply) is switched at a high frequency, in a similar manner as high-side switch 114 was switched in the conventional DC/DC converter 118. Low-side switch 312 is likewise switched at high frequency (albeit in reverse of the switches in supply selection switch 308) as in the conventional DC/DC converter 118. The result is that a pulse-width-modulated current passes through inductor L1 to charge capacitor C1, thus supplying the loads connected via terminal 314 with a regulated voltage.

Figure 4:
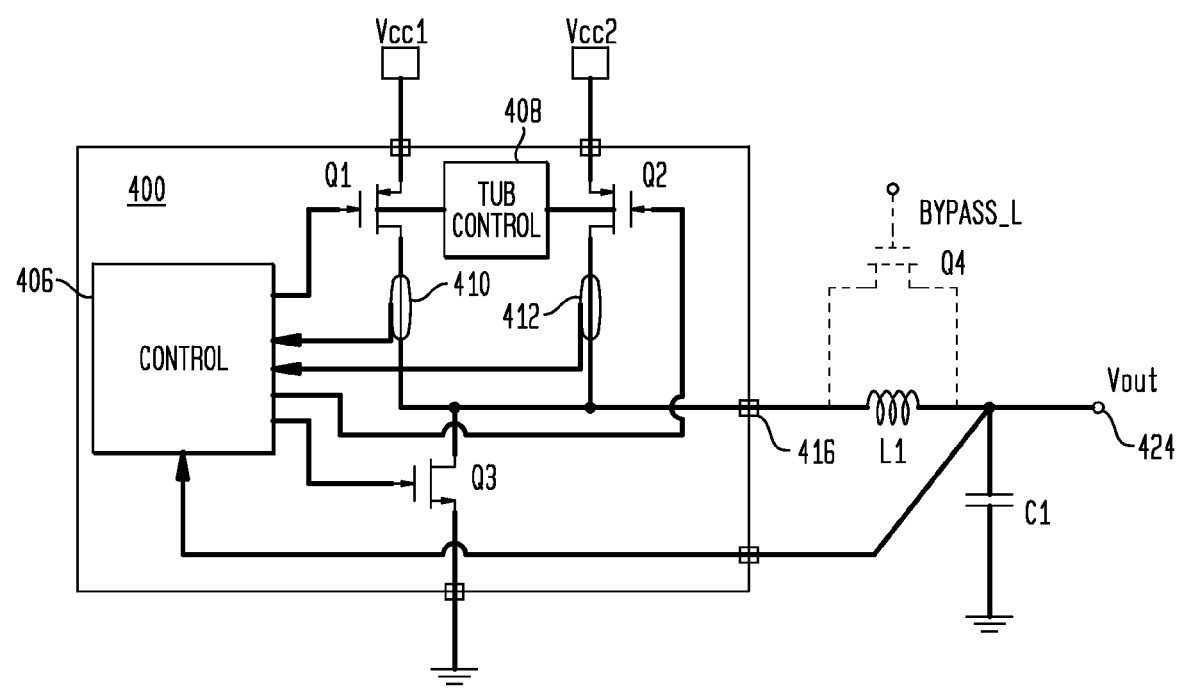
FIG. 4 is a block diagram further depicting a power controller in accordance with the invention.

FIG. 4 further depicts the dual-supply switching converter ("DSSC") of FIG. 3. In FIG. 4, the SPDT supply switch is formed by high-side switching transistors Q1 and Q2, and the low-side switch 312 is shown as transistor Q3. Control circuit 406 monitors the various voltages and currents in the DSSC and controls the switching of transistors Q1, Q2 and Q3 in FIG. 4. Inductor L1 and capacitor C1 are connected to output pin 416 of the DSSC. Assuming that a high switching frequency is used (e.g., 1 MHz), inductor L1 and capacitor C1 may be relatively small (e.g., about 2.2 to about 4.7 uH, and about 10 uF to about 22 uF, respectively) and may be implemented via discrete components connected to the DSSC IC 400. Capacitor C1 may be a low-cost, nonexplosive ceramic type capacitor.

Control circuit 406 may be implemented via combinational logic, as in an ASIC, or via a microcontroller or simple microprocessor. Control circuit 406 preferably includes an algorithm for determining whether the main supply voltage or the auxiliary supply voltage should be selected as the supply source at a given time. This algorithm is predetermined and may be based on a variety of factors, including the quality or voltage level of the main and auxiliary supply voltages Vcc1 and Vcc2 or the receipt of a predetermined control signal from a host computer.

After control circuit 406 determines that either the main supply voltage or the auxiliary supply voltage should be selected as the supply source, control circuit 406 outputs a suitable control signal to the gate of the high-side transistor associated with the non-selected supply source (e.g., Q1), so that that transistor is placed into a fully nonconductive state. Control circuit 406 further produces control signals causing the high-side transistor associated with the selected supply (e.g., Q2) to open and close at a predetermined rate and with a predetermined pulse width, and causing the low-side transistor Q3 to operate in reverse of the selected high-side transistor, as in a standard single-source switching converter. The above control signals may be produced in accordance with techniques well-known to those skilled in the art of switching DC/DC converters. In this manner, dual-supply switching converter 400 is capable of selecting one of the supply source voltages (main or auxiliary) and converts the selected voltage to a lower voltage at output terminal 424.

DSSC 400 may further include current sensing devices 410 and 412 to feed back a small portion of the current flowing through high-side transistors Q1 and Q2 to the control circuit 406. These current sensing devices 410 and 412 may be implemented via small transistors connected in parallel with high-side transistors Q1 and Q2, in the manner known to those skilled in the art. Control circuit 406 may then also monitor the current through the selected transistor (Q1 or Q2) and stabilize it using conventional cycle-by-cycle current limiting techniques.

In an alternative embodiment, low-side transistor Q3 may be replaced by a high-power Schottky rectifying diode of the type conventionally used in certain conventional single-transistor switching DC/DC converter circuits.

DSSC 400 may also include a tub control circuit 408 to control the biasing of the n-tub (also known as the n-well) of switching transistors Q1 and Q2 during switching and transfer from one source to the other source. Tub control circuit 408 monitors the output voltage, the two input voltages, and the voltages at various locations in the n-tub and produces a tub terminal bias voltage that is sufficient to reduce parasitic currents in the parasitic elements inherently present in transistors Q1 and Q2. The tub control circuit may be implemented via known techniques, such as those used in charge pump circuits. In addition, because the tub current may be as high as several hundred milliamperes, the n-tubs for each of transistors Q1 and Q2 should be connected via large tub ties so that the voltage drop across the tub ties is minimized.

Figure 5:
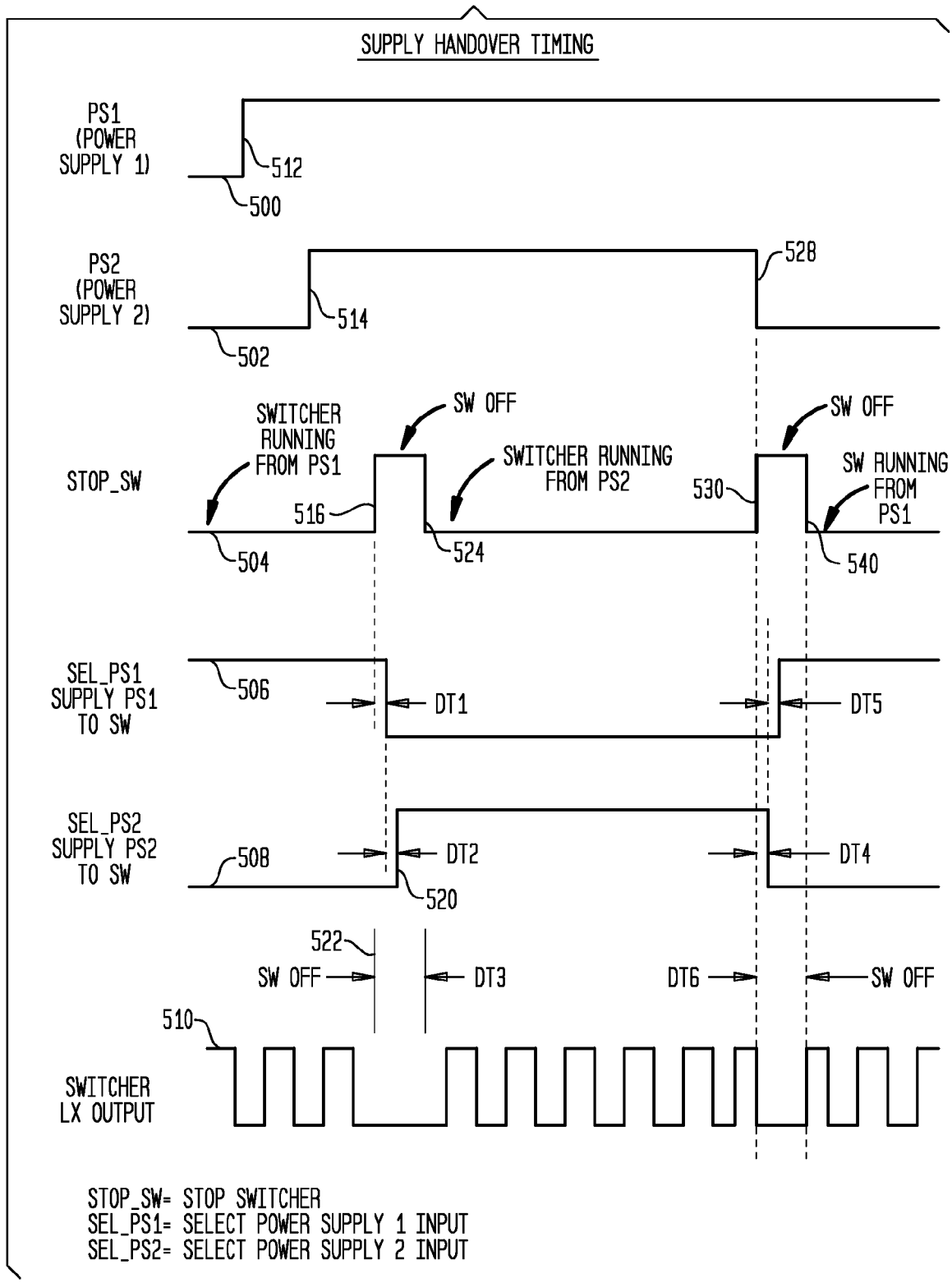
FIG. 5 is a timing diagram illustrating the operation of a power controller in accordance with the invention.

FIG. 5 depicts control timing suitable for operating the DSSC. In FIG. 5, traces 500 and 502 depict the voltage at the main power supply (PS1 in FIG. 5) and the voltage at the auxiliary power supply (PS2 in FIG. 5), respectively. Trace 504 depicts an internal signal STOP_SW within control circuit 406 that is used to temporarily halt the cycling of the DSSC during the switch-over from one supply source to the other. Traces 506 and 508 depict two other signals SEL_PS1 and SEL_PS2, also internal to control circuit 406, that indicate whether the main power supply PS1 or the auxiliary power supply PS2 is to be used as the selected power source. Finally, trace 510 labeled LX OUTPUT depicts the DSSC output signal at pin 416, which is passed to the series inductor L1.

Initially, both the main power supply voltage and the auxiliary power supply voltage are shown as "off." At time 512, the main power supply voltage ramps up to its normal level (e.g., 5.0V), and the DSSC commences switching Q1 and Q3 to generate the LX square-wave output. At time 514, the auxiliary power supply ramps up to its normal level. At time 516, the control circuit determines that the DSSC should switch from the main power supply to the auxiliary power supply. This determination may be made in accordance with a predetermined algorithm based on a variety of factors, including the quality or level of the main and auxiliary supply voltages and the "preferred" source for a given application, such as utility power rather than battery power.

The determination to switch from one supply to the other is reflected in FIG. 5 by the STOP_SW signal going "high." This STOP_SW signal causes control circuit 406 to cease switching either of the high-side transistors while the transfer is made from one supply to the other (i.e., during time period dt3). The cessation of switching is reflected on LX OUTPUT at time 522, in that the LX OUTPUT stays "low" while STOP_SW is "high." After the STOP_SW signal goes "high," and further after a short time delay DT1, the SEL_PS1 signal goes "low," thus causing control circuit 406 to cease switching high-side transistor Q1 and instead to place it into a nonconductive state, and further to "open" transistor Q3 so that current is enabled to continue flowing in the loop formed by transistor Q3, L1, the load circuits and ground. After a further short time delay DT2, at time 520 the SEL_PS2 goes high, thus indicating that control circuit 406 should commence switching transistor Q2 associated with the auxiliary power source. Accordingly, at time 524 the STOP_SW signal is released and the control circuit commences switching transistors Q2 and Q3 to produce LX OUTPUT signals once again, from the auxiliary power source. It may be seen from the above sequence that the transfer from transistors Q1 and Q2 is made in a break-before-make manner.

Between times 524 and 530, the DSSC continues running from the auxiliary power supply. If, for some reason, the auxiliary power supply signal PS2 should turn off or become invalid (as shown at time 528), the DSSC will transfer back to the main power supply. Accordingly, at time 530 the DSSC is turned "off," high-side transistor Q2 is deselected (after delay DT4) and high-side transistor Q1 is reselected (after delay DT5). After a total delay DT6, at time 540 the DSSC is turned back on and the LX output is restarted.

Preferably, the transfer from one supply source to the other is made as rapidly as possible, in order to avoid transient voltage effects from appearing at output Vout. For example, if the DSSC is operated at a 1.44 MHz switching frequency (or about a 700 ns clock cycle), the transfer is preferably accomplished within one clock cycle.

In a further embodiment, an optional inductor bypass transistor Q4 (shown in phantom in FIG. 4), may be provided across inductor L1, and the inductor current monitored during the period of time in which STOP_SW is "high." If the inductor current begins to approach zero during time periods dt3 or dt6, then the inductor bypass transistor Q4 may be turned "on," and low-side transistor Q3 turned "off." In this manner, reverse current that might tend to flow from capacitor C1 through the inductor and through transistor Q3 to ground may be avoided, and the output voltage Vout will simply be maintained at approximately its pre-transfer level by capacitor C1.

The DSSC as described above represents a significant improvement over conventional power controllers. Conventional power controllers require two high-power switching transistors in a voltage supply selection IC and two additional high-power switching transistors in a switching DC/DC converter IC. Thus, conventional power controllers require a total of four transistors, each of which must be a relatively large, high-power, low-impedance device. In contrast, the present invention requires only three transistors—two high-side transistors for selecting one of the two voltage supply sources and for providing high-side switching, and one low-side transistor for maintaining the flow of current through the series inductor and the load when the high-side transistors are "off." Alternatively, if a rectifying diode is used as the low-side rectifying device, then the present invention only requires the two high-side transistors and the diode. Moreover, the separate ICs in conventional power controllers require separate IC packaging, separate pins, separate power leads, separate control circuits, separate I/O circuits, etc. Using the DSSC in the present invention, these redundant elements are eliminated. The overall reduction in the number of circuit elements has yielded a DSSC that is significantly smaller than conventional power controllers.

Figure 6:
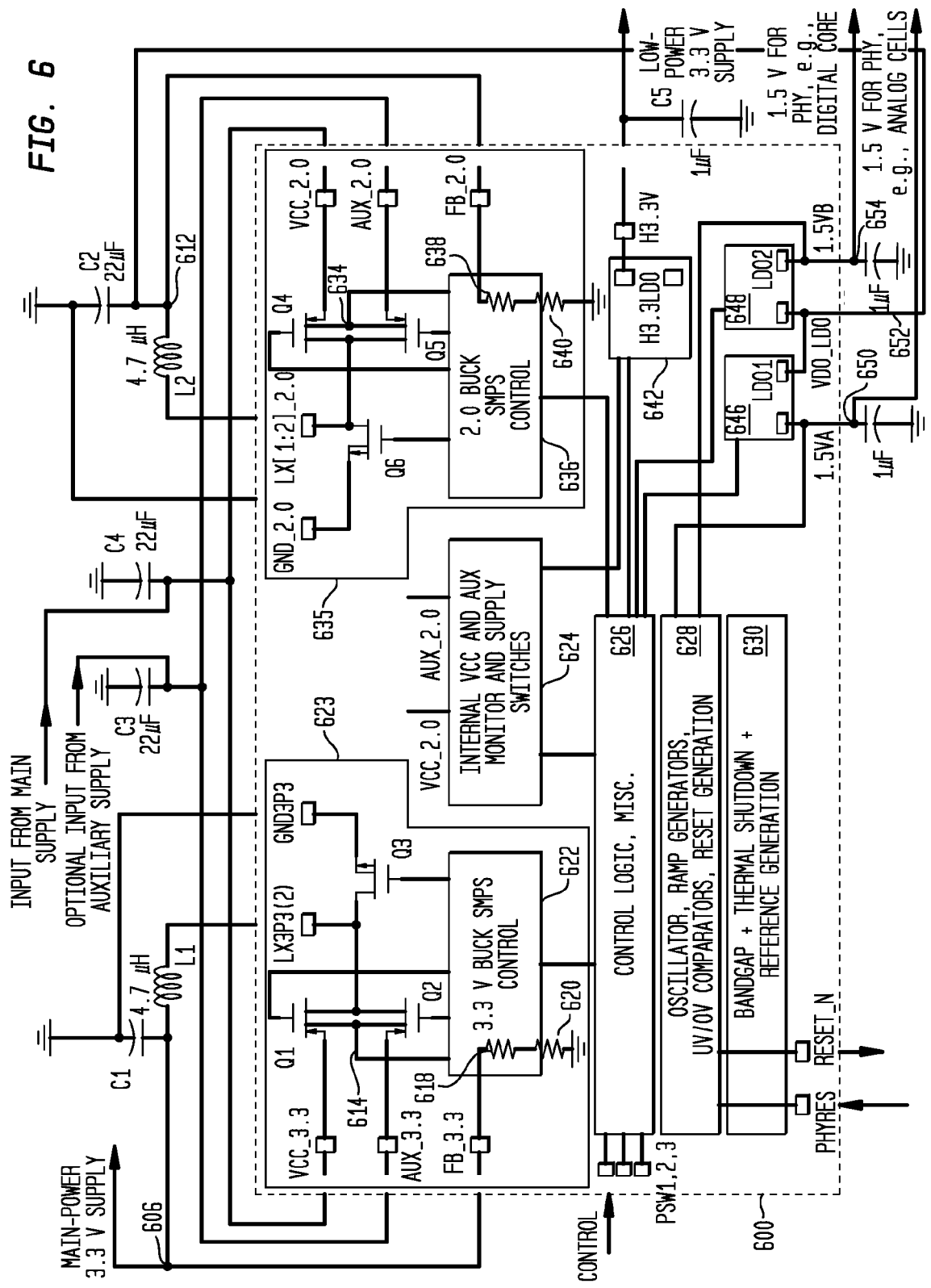
FIG. 6 is a block diagram depicting a further embodiment of a power controller in accordance with the invention.

Based on the reduction in circuit size attributable to the DSSC, the present inventors have succeeded in creating a multi-function power controller on a single integrated circuit having a die area of only 4.0 mm$^2$. FIG. 6 depicts a multi-function power controller ("MFPC") according to this aspect of the invention. As shown in FIG. 6, MFPC 600 may comprise two dual-supply switching converters ("DSSCs") 623, 635 that operate as described above with reference to FIGs. 3-5. Each DSSC 623,635 preferably receives both a main power input (VCC_3.3, VCC_2.0) and an auxiliary power input (AUX_3.3, AUX_2.0). These power inputs preferably have voltages that are between 2.5V and 5.5V, and more preferably that are 3.3V or 5.0 V, e.g. in compliance with current (m)PCI specifications. Each DSSC 623,635 comprises three transistors (Q1-Q3; Q4-Q6) that are controlled by control circuits 622 and 636. Tub control for transistors Q1, Q2, Q5 and Q6, as described above with reference to FIGs. 4 and 5, is also provided by control circuits 622 and 636 via connections 614 and 634. Finally, each DSSC 623,635 has a switched output (LX3P3, LX_2.0) for connection to series inductor L1, L2 and shunt capacitor C1, C2, respectively. The regulated supply voltage output from each DSSC is shown at nodes 606 and 612.

In order to provide a variety of regulated supply voltages typically needed by various integrated circuits in a PC expansion card, e.g., a wireless network interface card, the first DSSC 623 (comprising Q1-Q3) preferably converts the selected main or auxiliary supply voltage to a regulated "main" 3.3V power at node 606, while the second DSSC 635 (comprising Q4-Q6) preferably converts the main or auxiliary power input to a lower voltage, such as 2.0 V, at node 612. Each DSSC 623,635 further includes a feedback connection between nodes 606, 612 and terminals FB_3.3 and FB_2.0, which are further connected (within DSSC controllers 622, 636) to resistive voltage dividers 618, 620 and 638,640. The feedback voltage output from the voltage dividers is then used to adjust the frequency of the switching of the switching transistors Q1-Q6. The oscillator and ramp generator signals customarily needed by switching converters are generated in block 628.

The MFPC 600 further may comprise two low-drop-out regulators ("LDO1" and "LDO2") 646, 648. As shown in FIG. 6, LDO1 and LDO2 preferably receive a 2.0V input VDO LDO, taken from the regulated output 612 of the DSSC 635 via connection 652. LDO1 and LDO2 efficiently convert the 2.0V input down to a 1.5V regulated output 650, 654. Capacitors C6 and C7 are connected between regulator outputs 650, 654 and ground, respectively, and serve to stabilize the output voltage at outputs 650, 654. Advantageously, the two outputs from LDO1 and LDO2 may be used to supply expansion card circuits that otherwise might interfere with one another if supplied from a single voltage source. For example, if the MFPC 600 is applied in a wireless LAN card, the output of LDO1 may be used to supply the analog circuits of the physical interface (PHY) in the LAN card, while the output of LDO2 may be used to supply the core digital circuits of the PHY interface.

The MFPC 600 further may include a stand-by supply, e.g., for supplying a WMAC standby current and supplying power to the various control and logic circuits on the MFPC 600. The stand-by supply is preferably provided via a separate host supply source-selection switch in block 624 (connected to VCC_2.0 and AUX_2.0), followed by a third low-drop-out regulator 642 that preferably has a very low quiescent current. Regulator 642 preferably provides a 3.3V supply voltage needed by the logic circuits in the two DSSC controllers 622, 636. In order to save power in standby mode, regulator 642 is preferably a low-quiescent current device having a quiescent current of no more than 10 mA.

The MFPC 600 may also provide a bypass feature. As described in the background section above, a bypass feature is conventionally used to pass a supply source voltage from the input of a DC/DC converter directly to the output of the DC/DC converter, via a separate, discrete bypass transistor IC. In the present invention, however, this function is accomplished by placing the shunt transistors (Q3 or Q6) into a nonconductive state (i.e., turned "off") while either the main or auxiliary switching transistors (Q1,Q2 or Q4,Q5, depending on the desired supply source, either main or auxiliary) are placed into a fully conductive state. Thus, the switching transistors are essentially placed into a 100% duty cycle. As a result, the output of the DSSCs 623,635 will be the voltage of the selected input (main or auxiliary) minus the relatively small resistive voltage drop of the switching transistors themselves. In this manner, the present invention provides a bypass function without requiring a separate bypass transistor IC.

MFPC 600 further may include a reset circuit, shown in block 628. The reset circuit includes overvoltage and undervoltage comparators that monitor the voltages received and/or generated by the various DSSCs and regulators on the MFPC 600. If they are out of range, the reset circuit generates a RESET_N signal, which indicates to other circuits connected to the MFPC 600 that the MFPC voltages are out-of-range. This supply voltage monitoring functionality removes the need for external reset circuitry. Block 628 may also include oscillator and ramp generator circuits as shown in FIG. 6.

The reset circuit further includes a separate reset-input pin "PHYRES" that allows for external reset events, e.g., from a host computer. The reset circuit will activate the RESET_N signal if it receives the PHYRES signal. The reset circuit will also activate the RESET_N signal during the initialization and power-up stage of MFPC 600.

The MFPC 600 may also include thermal monitoring and shutdown circuits (block 630). If the temperature of the MFPC IC rises above a temperature that would cause irreversible damage, the thermal monitoring and shutdown circuits disable MFPC 600 and thereby prevent from causing damage to itself or to other circuits on the expansion card. Block 630 may further include circuits for generating one or more reference voltages used in the MFPC 600, e.g., via a conventional bandgap reference circuit as shown in FIG. 6.

Advantageously, the various DSSCs and regulators on the MFPC may be individually controlled (i.e., turned on and off) by control circuit 626. In the embodiment shown in FIG. 6, the MFPC receives three external control signals PSW1, PSW2, and PSW3. As an example, a signal on PSW1 may control whether the 2.0V DSSC 635 and the two 1.5V LDOs 646, 648 are active or shut down, while a signal on PSW2 may control whether the 3.3V DSSC 623 is active or shut down. Finally, a signal on PSW3 may control whether the 3.3V DSSC 623 is to be placed into bypass mode or not (i.e., should pass Vcc or Vaux directly to the LX_3.3 output, as described above). In this manner, the MFPC may receive commands from a host computer (e.g., to place an expansion card into various active, "sleep," and "deep sleep" modes) and activate or deactivate the various PSSCs and regulators on the MFPC 600 in response to those commands.

It will be recognized that MFPC 600 is not limited solely to a particular host computer configuration, or solely to applications involving expansion cards. Rather, it may be utilized in any circuit requiring the various voltages that the MFPC 600 is capable of supplying.

While the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. A multiple-output power supply device, comprising:
    a monolithic integrated circuit including
        a first switching converter on a first portion of the monolithic integrated circuit;
        a second switching converter on a second portion of the monolithic integrated circuit; and
        a control circuit connected to the first and second switching converters and capable of independently enabling and disabling each of the first and second switching converters.

2. The device of claim 1, wherein the first switching converter has a terminal for receiving a first supply voltage and a terminal for receiving a second supply voltage, and wherein the first switching converter is capable of converting a selected one of the first and second supply voltages to a DC regulated output signal.

3. The device of claim 2, wherein the first switching converter is configured to convert the selected one of the first and second supply voltages to a regulated output signal, without employing the non-selected one of the first and second supply voltages.

4. The device of claim 2, wherein the second switching converter has a terminal for receiving the first supply voltage and a terminal for receiving the second supply voltage, and wherein the second switching converter is capable of converting a selected one of the first and second supply voltages to a DC regulated output signal.

5. The device of claim 1, wherein at least one of the first and second switching converters is capable of operating near a 100% switching duty cycle, wherein the at least one of the first and second switching converters operates in a bypass mode.

6. The device of claim 1, wherein:
    each of the first and second switching converters has an output voltage terminal,
    the monolithic integrated circuit further includes a first low-drop-out regulator located on a third portion of the monolithic integrated circuit and having an input voltage terminal connected to the output voltage terminal of at least one of the first switching converter and the second switching converter, and
    the control circuit is further connected to the first low-drop-out regulator and is capable of enabling and disabling the first low-drop-out regulator.

7. The device of claim 6, wherein the monolithic integrated circuit further includes:
    a second low-drop-out regulator having an input voltage terminal connected to the output voltage terminal of at least one of the first switching converter and the second switching converter, and located on a fourth portion of the monolithic integrated circuit; and
    wherein the control circuit is further connected to the second low-dropout regulator and is capable of enabling and disabling the second low-dropout regulator.

8. The device of claim 7, wherein the first switching converter has a terminal for receiving a first supply voltage and a terminal for receiving a second supply voltage;
    wherein the first switching converter is capable of converting a selected one of the first and second supply voltages to a DC regulated output signal; and
    wherein the monolithic integrated circuit further includes:
    a standby low-drop-out regulator having a terminal for receiving at least one of the first supply voltage and the second supply voltage, and located on a fifth portion of the monolithic integrated circuit; and
    wherein the control circuit is further connected to the standby low-drop-out regulator and is capable of enabling and disabling the standby low-drop-out regulator.

9. The device of claim 6, wherein the monolithic integrated circuit further includes:
    a reset circuit connected to a predetermined output of at least one of the first and second switching converters and the first low-drop-out regulator, wherein the reset circuit produces a reset signal if the voltage at the predetermined output is outside a predetermined voltage range.

10. The device of claim 1, wherein:
    the control circuit includes at least one input terminal capable of receiving an external control signal indicating whether the first and second switching converters are to be independently enabled or disabled; and
    the control circuit is configured to independently enable or disable the first and second switching converters based on the external control signal.

11. The device of claim 1, wherein:
    the second switching converter comprises:
        a high-side transistor connected to the input voltage terminal of the second switching converter and to an output voltage terminal; and
        a low-side rectifier connected to the output voltage terminal;
    the high-side transistor switches between a conductive state and a non-conductive state at a switching frequency; and
    the low-side rectifier produces a rectified voltage at the output voltage terminal.

12. A method for providing a plurality of regulated output voltages via a single monolithic integrated circuit, comprising the steps of:
    providing a first switching converter on a first portion of the monolithic integrated circuit;
    providing a second switching converter on a second portion of the monolithic integrated circuit;
    providing a control circuit connected to the first and second switching converters; and
    independently enabling and disabling each of the first and second switching converters via the control circuit.

13. The method of claim 12, further including the steps of:
    supplying a first supply voltage and a second supply voltage to the first switching converter; and converting a selected one of the first and second supply voltages to a DC regulated output signal via the first switching converter.

14. The method of claim 13, wherein the step of converting the selected one of the first and second supply voltages to a regulated output signal via the first switching converter is performed without employing the non-selected one of the first and second supply voltages.

15. The method of claim 13, further comprising the steps of:
supplying the first supply voltage and the second supply voltage to the second switching converter; and
converting a selected one of the first and second supply voltages to a DC regulated output signal via the second switching converter.

16. The method of claim 12, further comprising the step of:
operating at least one of the first and second switching converters near a 100% switching duty cycle such that the at least one of the first and second switching converters operates in a bypass mode.

17. The method of claim 12, wherein each of the first and second switching converters has an output voltage terminal, and the method further comprises the steps of:
providing a first low-drop-out regulator (i) connected to the control circuit, (ii) having an input voltage terminal connected to the output voltage terminal of at least one of the first switching converter and the second switching converter, and (iii) located on a third portion of the monolithic integrated circuit; and
enabling and disabling the first low-drop-out regulator via the control circuit.

18. The method of claim 17, further including the steps of:
providing a second low-drop-out regulator (i) connected to the control circuit, (ii) having an input voltage terminal connected to the output voltage terminal of at least one of the first switching converter and the second switching converter, and (iii) located on a fourth portion of the monolithic integrated circuit; and
enabling and disabling the second low-drop-out regulator via the control circuit.

19. The method of claim 18, further including the steps of:
providing a standby low-drop-out regulator on a fifth portion of the monolithic integrated circuit, connected to the control circuit;
selecting one of a first supply voltage and a second supply voltage to be supplied to the standby low-drop-out regulator; and
passing the selected supply voltage to the standby low-drop-out regulator, and
enabling and disabling the standby low-drop-out regulator via the control circuit.

20. The method of claim 17, further comprising the steps of:
providing a reset circuit connected to a predetermined output of at least one of the first and second switching converters and the first low-drop-out regulator;
monitoring the voltage at the predetermined output; and
producing a reset signal via the reset circuit if the voltage at the predetermined output is outside a predetermined voltage range.

21. The method of claim 12, further comprising the step of providing an external control signal to the control circuit indicating whether the first and second switching converters are to be enabled or disabled;
wherein the step of independently enabling and disabling each of the first and second switching converters via the control circuit is performed based on the external control signal.

22. The method of claim 12, wherein:
the second switching converter comprises:
a high-side transistor connected to the input voltage terminal of the second switching converter and to an output voltage terminal; and
a low-side rectifier connected to the output voltage terminal; and
the method further comprises the steps of:
switching the high-side transistor between a conductive state and a non-conductive state at a switching frequency to produce a switched signal; and
the low-side rectifier rectifying the switched signal to produce a rectified voltage at the output voltage terminal.

* * * * *

UNITED STATES PATENT AND TRADEMARK OFFICE
CERTIFICATE OF CORRECTION

PATENT NO. : 7,595,569 B2　　　　　　　　　　　　　　　　　　　　　　　　　　Page 1 of 1
APPLICATION NO. : 11/059787
DATED : September 29, 2009
INVENTOR(S) : Jan Amerom et al.

It is certified that error appears in the above-identified patent and that said Letters Patent is hereby corrected as shown below:

On the Title Page, Item (74), replace "Mendelsohn, Drucker & Associates, PC; David L. Cragille" with --Mendelsohn, Drucker, & Associates, PC; David L. Cargille--.

Signed and Sealed this

Seventeenth Day of August, 2010

David J. Kappos
*Director of the United States Patent and Trademark Office*